US009407526B1

(12) United States Patent
Addepalli et al.

(10) Patent No.: US 9,407,526 B1
(45) Date of Patent: Aug. 2, 2016

(54) NETWORK LIVELINESS DETECTION USING SESSION-EXTERNAL COMMUNICATIONS

(71) Applicant: Juniper Networks, Inc., Sunnyvale, CA (US)

(72) Inventors: Meher Aditya Kumar Addepalli, Sunnyvale, CA (US); Prashant Singh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/617,777

(22) Filed: Feb. 9, 2015

Related U.S. Application Data

(63) Continuation of application No. 13/731,993, filed on Dec. 31, 2012, now Pat. No. 8,953,460.

(51) Int. Cl.
*H04L 12/26* (2006.01)

(52) U.S. Cl.
CPC ............... *H04L 43/10* (2013.01); *H04L 43/08* (2013.01)

(58) Field of Classification Search
CPC ...... H04L 43/10; H04L 12/26; H04L 12/2602
USPC ................. 370/241, 244, 245, 250, 252, 253; 709/227, 228, 238, 239
See application file for complete search history.

(56) References Cited

U.S. PATENT DOCUMENTS

| 5,253,248 A | 10/1993 | Dravida et al. |
| 5,613,136 A | 3/1997 | Casavant et al. |
| 5,721,855 A | 2/1998 | Hinton et al. |
| 5,848,128 A | 12/1998 | Frey |

(Continued)

FOREIGN PATENT DOCUMENTS

| EP | 1367750 A1 | 12/2003 |
| EP | 1861963 A2 | 12/2007 |

(Continued)

OTHER PUBLICATIONS

"ActiveXperts Ping backgrounds (PING is part of the ActiveSocket Toolkit)," ActiveSocket Network Communication Toolkit 2.4, Activexperts, www.activexperts.com/activsocket/toolkits/ping.html, last printed Nov. 10, 2005, 3 pp.

(Continued)

*Primary Examiner* — Dmitry H Levitan
(74) *Attorney, Agent, or Firm* — Shumaker & Sieffert, P.A.

(57) ABSTRACT

In general, techniques are described to dynamically refresh a timer for a communication session provided by a bidirectional forwarding detection (BFD) protocol. The techniques potentially mitigate network load by reducing the number of BFD packets required to maintain a BFD communication session. An example network device includes a memory, programmable processor(s), a network interface, and a control unit configured to establish a BFD communication session between the network device and a peer network device that is communicatively coupled to the network device via the network interface, determine whether a packet associated with a communication session other than the BFD communication session is a relevant packet to the BFD communication session, and in response to determining that the packet is the relevant packet, refresh a timer that executes on the network device and is associated with the BFD communication session.

22 Claims, 6 Drawing Sheets

(56) References Cited

U.S. PATENT DOCUMENTS

| | | | |
|---|---|---|---|
| 5,933,601 A | 8/1999 | Fanshier et al. |
| 6,052,720 A | 4/2000 | Traversat et al. |
| 6,101,500 A | 8/2000 | Lau |
| 6,148,337 A | 11/2000 | Estberg et al. |
| 6,163,544 A | 12/2000 | Andersson et al. |
| 6,173,411 B1 | 1/2001 | Hirst et al. |
| 6,212,559 B1 | 4/2001 | Bixler et al. |
| 6,223,260 B1 | 4/2001 | Gujral et al. |
| 6,255,943 B1 | 7/2001 | Lewis et al. |
| 6,263,346 B1 | 7/2001 | Rodriquez |
| 6,272,537 B1 | 8/2001 | Kekic et al. |
| 6,304,546 B1 | 10/2001 | Natarajan et al. |
| 6,310,890 B1 | 10/2001 | Choi |
| 6,374,329 B1 | 4/2002 | McKinney et al. |
| 6,389,464 B1 | 5/2002 | Krishnamurthy et al. |
| 6,393,481 B1 | 5/2002 | Deo et al. |
| 6,405,289 B1 | 6/2002 | Arimilli et al. |
| 6,453,430 B1 | 9/2002 | Singh et al. |
| 6,466,973 B2 | 10/2002 | Jaffe |
| 6,477,566 B1 | 11/2002 | Davis et al. |
| 6,477,572 B1 | 11/2002 | Elderton et al. |
| 6,480,955 B1 | 11/2002 | DeKoning et al. |
| 6,502,131 B1 | 12/2002 | Vaid et al. |
| 6,507,869 B1 | 1/2003 | Franke et al. |
| 6,510,164 B1 | 1/2003 | Ramaswamy et al. |
| 6,516,345 B1 | 2/2003 | Kracht |
| 6,529,941 B2 | 3/2003 | Haley et al. |
| 6,542,934 B1 | 4/2003 | Bader et al. |
| 6,563,800 B1 | 5/2003 | Salo et al. |
| 6,584,499 B1 | 6/2003 | Jantz et al. |
| 6,618,360 B1 | 9/2003 | Scoville et al. |
| 6,636,242 B2 | 10/2003 | Bowman-Amuah |
| 6,662,221 B1 | 12/2003 | Gonda et al. |
| 6,681,232 B1 | 1/2004 | Sistanizadeh et al. |
| 6,684,343 B1 | 1/2004 | Bouchier et al. |
| 6,725,317 B1 | 4/2004 | Bouchier et al. |
| 6,738,908 B1 | 5/2004 | Bonn et al. |
| 6,751,188 B1 | 6/2004 | Medved et al. |
| 6,804,816 B1 | 10/2004 | Liu et al. |
| 6,816,897 B2 | 11/2004 | McGuire |
| 6,816,905 B1 | 11/2004 | Sheets et al. |
| 6,850,253 B1 | 2/2005 | Bazerman et al. |
| 6,910,148 B1 | 6/2005 | Ho et al. |
| 6,922,685 B2 | 7/2005 | Greene et al. |
| 6,934,745 B2 | 8/2005 | Krautkremer |
| 6,952,728 B1 | 10/2005 | Alles et al. |
| 6,982,953 B1 | 1/2006 | Swales |
| 6,983,317 B1 | 1/2006 | Bishop et al. |
| 6,990,517 B1 | 1/2006 | Bevan et al. |
| 7,024,450 B1 | 4/2006 | Deo et al. |
| 7,055,063 B2 | 5/2006 | Leymann et al. |
| 7,069,344 B2 | 6/2006 | Carolan et al. |
| 7,082,463 B1 | 7/2006 | Bradley et al. |
| 7,082,464 B2 | 7/2006 | Hasan et al. |
| 7,085,277 B1 | 8/2006 | Proulx et al. |
| 7,085,827 B2 | 8/2006 | Ishizaki et al. |
| 7,093,280 B2 | 8/2006 | Ke et al. |
| 7,099,912 B2 | 8/2006 | Ishizaki et al. |
| 7,103,647 B2 | 9/2006 | Aziz |
| 7,120,693 B2 | 10/2006 | Chang et al. |
| 7,124,289 B1 | 10/2006 | Suorsa |
| 7,130,304 B1 | 10/2006 | Aggarwal |
| 7,131,123 B2 | 10/2006 | Suorsa et al. |
| 7,139,263 B2 | 11/2006 | Miller et al. |
| 7,151,775 B1 | 12/2006 | Renwick et al. |
| 7,152,109 B2 | 12/2006 | Suorsa et al. |
| 7,161,946 B1 | 1/2007 | Jha |
| 7,184,437 B1 | 2/2007 | Cole et al. |
| 7,200,662 B2 | 4/2007 | Hasan et al. |
| 7,206,836 B2 | 4/2007 | Dinker et al. |
| 7,219,030 B2 | 5/2007 | Ohtani |
| 7,236,453 B2 | 6/2007 | Visser et al. |
| 7,305,492 B2 | 12/2007 | Bryers et al. |
| 7,310,666 B2 | 12/2007 | Benfield et al. |
| 7,313,611 B1 | 12/2007 | Jacobs et al. |
| 7,359,377 B1 | 4/2008 | Kompella et al. |
| 7,362,700 B2 | 4/2008 | Frick et al. |
| 7,363,353 B2 | 4/2008 | Ganesan et al. |
| 7,379,987 B2 | 5/2008 | Ishizaki et al. |
| 7,391,719 B2 | 6/2008 | Ellis et al. |
| 7,406,030 B1 | 7/2008 | Rijsman |
| 7,406,035 B2 | 7/2008 | Harvey et al. |
| 7,433,320 B2 | 10/2008 | Previdi et al. |
| 7,447,167 B2 | 11/2008 | Nadeau et al. |
| 7,471,638 B2 | 12/2008 | Torrey et al. |
| 7,487,232 B1 | 2/2009 | Matthews et al. |
| 7,506,194 B2 | 3/2009 | Appanna et al. |
| 7,508,772 B1 | 3/2009 | Ward et al. |
| 7,522,599 B1 | 4/2009 | Aggarwal et al. |
| 7,523,185 B1 | 4/2009 | Ng et al. |
| 7,539,769 B2 | 5/2009 | McGuire |
| 7,561,527 B1 | 7/2009 | Katz et al. |
| 7,606,898 B1 | 10/2009 | Hunt et al. |
| 7,609,637 B2 | 10/2009 | Doshi et al. |
| 7,639,624 B2 | 12/2009 | McGee et al. |
| 7,724,677 B2 | 5/2010 | Iwami |
| 7,738,367 B1 | 6/2010 | Aggarwal et al. |
| 7,765,306 B2 * | 7/2010 | Filsfils .............. H04L 45/02 709/207 |
| 7,765,328 B2 | 7/2010 | Bryers et al. |
| 7,852,778 B1 | 12/2010 | Kompella |
| 7,860,981 B1 * | 12/2010 | Vinokour ............ G06F 15/16 370/241 |
| 7,940,646 B1 | 5/2011 | Aggarwal et al. |
| 7,957,330 B1 | 6/2011 | Bahadur et al. |
| 7,990,888 B2 | 8/2011 | Nadeau et al. |
| 8,019,835 B2 | 9/2011 | Suorsa et al. |
| 8,254,271 B1 | 8/2012 | Nadeau et al. |
| 8,266,264 B2 | 9/2012 | Hasan et al. |
| 8,370,528 B2 | 2/2013 | Bryers et al. |
| 8,488,444 B2 | 7/2013 | Filsfils et al. |
| 8,503,293 B2 | 8/2013 | Raszuk |
| 8,543,718 B2 * | 9/2013 | Rahman ............... H04L 45/00 709/230 |
| 8,693,398 B1 | 4/2014 | Chaganti et al. |
| 8,797,886 B1 | 8/2014 | Kompella et al. |
| 8,902,780 B1 | 12/2014 | Hedge et al. |
| 8,953,460 B1 | 2/2015 | Addepalli et al. |
| 2001/0042190 A1 | 11/2001 | Tremblay et al. |
| 2002/0007443 A1 | 1/2002 | Gharachorloo et al. |
| 2002/0032725 A1 | 3/2002 | Araujo et al. |
| 2002/0038339 A1 | 3/2002 | Xu |
| 2002/0093954 A1 | 7/2002 | Weil et al. |
| 2002/0105972 A1 | 8/2002 | Richter et al. |
| 2002/0158900 A1 | 10/2002 | Hsieh et al. |
| 2002/0165727 A1 | 11/2002 | Greene et al. |
| 2002/0169975 A1 | 11/2002 | Good |
| 2002/0191014 A1 | 12/2002 | Hsieh et al. |
| 2002/0194497 A1 | 12/2002 | Mcguire |
| 2002/0194584 A1 | 12/2002 | Suorsa et al. |
| 2003/0005090 A1 | 1/2003 | Sullivan et al. |
| 2003/0009552 A1 | 1/2003 | Benfield et al. |
| 2003/0055933 A1 | 3/2003 | Ishizaki et al. |
| 2003/0097428 A1 | 5/2003 | Afkhami et al. |
| 2003/0112749 A1 | 6/2003 | Hassink et al. |
| 2003/0149746 A1 | 8/2003 | Baldwin et al. |
| 2004/0024869 A1 | 2/2004 | Davies |
| 2004/0116070 A1 | 6/2004 | Fishman et al. |
| 2005/0021713 A1 | 1/2005 | Dugan et al. |
| 2005/0083936 A1 | 4/2005 | Ma |
| 2005/0195741 A1 | 9/2005 | Doshi et al. |
| 2005/0259634 A1 | 11/2005 | Ross |
| 2005/0281192 A1 | 12/2005 | Nadeau et al. |
| 2006/0018266 A1 | 1/2006 | Seo |
| 2006/0095538 A1 | 5/2006 | Rehman et al. |
| 2006/0133300 A1 | 6/2006 | Lee et al. |
| 2006/0233107 A1 | 10/2006 | Croak et al. |
| 2006/0239201 A1 | 10/2006 | Metzger et al. |
| 2006/0262772 A1 | 11/2006 | Guichard et al. |
| 2006/0285500 A1 | 12/2006 | Booth, III et al. |
| 2007/0021132 A1 | 1/2007 | Jin et al. |
| 2007/0041554 A1 | 2/2007 | Newman et al. |
| 2007/0061103 A1 | 3/2007 | Patzschke et al. |
| 2007/0165515 A1 | 7/2007 | Vasseur |

(56) References Cited

U.S. PATENT DOCUMENTS

| | | | |
|---|---|---|---|
| 2007/0180104 | A1 | 8/2007 | Filsfils et al. |
| 2007/0180105 | A1 | 8/2007 | Filsfils et al. |
| 2007/0207591 | A1 | 9/2007 | Rahman et al. |
| 2007/0220252 | A1 | 9/2007 | Sinko |
| 2007/0263836 | A1 | 11/2007 | Huang |
| 2007/0280102 | A1 | 12/2007 | Vasseur et al. |
| 2008/0004782 | A1 | 1/2008 | Kobayashi et al. |
| 2008/0049622 | A1 | 2/2008 | Previdi et al. |
| 2008/0074997 | A1 | 3/2008 | Bryant et al. |
| 2008/0163291 | A1 | 7/2008 | Fishman et al. |
| 2008/0225731 | A1 | 9/2008 | Mori et al. |
| 2008/0247324 | A1 | 10/2008 | Nadeau et al. |
| 2008/0253295 | A1 | 10/2008 | Yumoto et al. |
| 2009/0016213 | A1 | 1/2009 | Lichtwald |
| 2009/0019141 | A1 | 1/2009 | Bush et al. |
| 2009/0046579 | A1 | 2/2009 | Lu et al. |
| 2009/0046723 | A1 | 2/2009 | Rahman et al. |
| 2009/0201799 | A1 | 8/2009 | Lundstrom et al. |
| 2009/0232029 | A1 | 9/2009 | Abu-Hamdeh et al. |
| 2010/0299319 | A1 | 11/2010 | Parson et al. |
| 2011/0019550 | A1 | 1/2011 | Bryers et al. |
| 2011/0063973 | A1 | 3/2011 | VenkataRaman et al. |
| 2011/0170408 | A1 | 7/2011 | Furbeck et al. |
| 2013/0028099 | A1 | 1/2013 | Birajdar et al. |
| 2013/0185767 | A1 | 7/2013 | Tirupachur Comerica et al. |

FOREIGN PATENT DOCUMENTS

| | | |
|---|---|---|
| EP | 1864449 A2 | 12/2007 |
| EP | 1891526 A2 | 2/2008 |

OTHER PUBLICATIONS

"Configure the loopback Interface," www.juniper.net/techpubs/software/junos/junos56/idenx.html, last pritned Nov. 7, 2005, 2 pp.

"ICMP (Internet Control Message Protocol)," Data Network Resource, www.rhyshaden.com/icmp.html, last printed Nov. 10, 2005, 4 pp.

"RFC 2151—(rfc2151)—A primer on Internet and TCP/IP Tools and Utilities," www.research.org/rfcview/RFC/2151.html, last printed Nov. 9, 2005, 3 pp.

"Traceroute," Webopedia, www.webopedia.com/TERM/t/traceroute.html, Aug. 26, 2004, 1 p.

"Using the IP unnumbered configuration FAQ," APNIC, www.apnic.net/info/faq/ipunnumb.html, Jul. 1, 2005, 2 pp.

Aggarwal et al., "Bidirectional Forwarding Detection (BFD) for MPLS Label Switched Paths (LSPs)," Internet Engineering Task Force (IETF), RFC 5884, Cisco Systems, Inc., Jun. 2010, 12 pp.

Aggarwal, "OAM Mechanisms in MPLS Layer 2 Transport Networks," IEEE Communications Magazine, Oct. 2004, pp. 124-130.

Atlas, "ICMP Extensions for Unnumbered Interfaces," draft-atlas-icmp-unnumbered-00, Dec. 9, 2005, 8 pp.

Atlas, "ICMP Extensions for Unnumbered Interfaces," draft-atlas-icmp-unnumbered-01, Feb. 2006, 8 pp.

Berkowitz, "Router Renumbering Guide," Network Working Group, RFC 2072, Jan. 1997, 41 pp.

Bonica et al., "Generic Tunnel Tracing Protocol (GTTP) Specification," draft-bonica-tunproto-OI.txt, IETF Standard-Working-Draft, Internet Engineering Task Force, Jul. 2001, 20 pp.

Chen et al., "Dynamic Capability for BGP-4," Network Working Group, Internet Draft, draft-ietf-idr-dynamic-cap-03.txt, Dec. 2002, 6 pp.

Gorry Fairhurst, "Internet Control Message protocol," Internet Control Protocol, (ICMP), www.erg.abdn.ac.uk/users/go.rry/course/inet-pages/icm.n.html, last printed Sep. 6, 2006,3 pp.

H3C S361 O&S551 0 Series Ethernet Switches (Version: 20081229-C-1.01, Release 5303, 2006-2008, Command Manual-BFD-GR).

Harmon, William "32-Bit Bus Master Ethernet Interface for the 68030 (Using the Macintosh SE/30)," Apr. 1993, 10 pp.

Hedge et al., Multipoint BFD for MPLS, Network Working Group, Internet-Draft, draft-chandra-hedge-mpoint-bfd-for-mpls-OO.txt, Mar. 2012, 12 pp.

Katz et al., "BFD for Multipoint Networks," Network Working Group, Internet Draft, draft-ietf-bfd-multipoint-OO.txt, Oct. 2011, 29 pp.

Katz et al., "Biderectional Forwarding Detection (BFD) for Multihop Paths," Internet Engineering Task Force (IETF), RFC 5883, Juniper Networks, Jun. 2010, 6 pp.

Katz et al., "Biderectional Forwarding Detection (BFD) for IPv4 and IPv6 (Single Hop)," Internet Engineering Task Force (IETF), RFC 5881, Juniper Networks, Jun. 2010, 7 pp.

Katz et al., "Biderectional Forwarding Detection (BFD)," Internet Engineering Task Force (IETF), RFC 5880, Juniper Networks, Jun. 2010, 49 pp.

Katz et al., "Generic Application of Bidirectional Forwarding Detection (BFD)," Internet Engineering Task Force (IETF), RFC 5882, Juniper Networks, Jun. 2010, 15 pp.

Katz et al., "BFD for Multipoint Networks," Network Working Group, Internet Draft, draft-ietf-bfd-multipoint-00.txt, Oct. 2011, 29 pp.

Kolon, "BFD spots router forwarding failures," Network World, www.networkworld.com/news/tech/2005/030705techupdate.html, Mar. 7, 2005, 3 pp.

Kompella et al., "Detecting Multi-Protocol Label Switched (MPLS) Data Plane Failures," Network Working Group, RFC 4379, Cisco Systems, Inc., Feb. 2006, 50 pp.

Kompella et al., Signalling Unnumbered Links in Resource ReSerVation Protocol-Traffic Engineering (RSVP-TE), Network Working Group, RFC 3477, Jan. 2003, 8 pp.

Mannie, "Generalized Multi-Protocol Label Switching Architecture," Network Working Group, Internet draft, draft-ietf-ccamp-gmpls-architecture-07.txt, May 2003, 56 pp.

Muller, Nathan J., "Managing Service Level Agreements," International Journal of Network Management, John Wiley & Sons, Ltd., May 1999, vol. 9, Issue 3, pp. 155-166.

Nadeau et al., "Bidirectional Forwarding Detection (BFD) for the Pseudowire Virtual Circuit Connectivity Verification (VCCV)," Internet Engineering Task Force (IETF), RFC 5885, Cisco Systems, Inc., Jun. 2010, 11 pp.

Papavassiliou, Symeon, "Network and service management for wide-area electronic commerce networks," International Journal of Network Management, John Wiley & Sons, Ltd., Mar. 2001, vol. 11, Issue 2, pp. 75-90.

Sangli et al., "Graceful Restart Mechanism for BGP," Network Working Group, Internet Draft, draft-ietf-idr-restart-06.txt, http:l/toolsietf.ort/html/draft-ietf-idr-restart-06, Jan. 2003, 10 pp.

Saxena et al., Detecting Data-Plane Failures in Point-to-Multipoint Mpls-Extensions to LSP Ping, Internet Engineering Task Force (IETF) RFC 6425, Nov. 2011, 28 pp.

Schmidt, Douglas C., "A Family of Design Patterns for Flexibly Configuring Network Services in Distributed Systems," Proceedings of the Third International Conference on Configurable Distributed Systems, May 6-8, 1996, IEEE Press, pp. 124-135.

Sun Hai-feng, "Advanced TCP Port Scan and it's Response," O.L. Automation 2005, vol. 24, No. 4, China Academic Electronic Publishing House, Apr. 24, 2005, 2 pp. (Abstract only).

Troutman, Denise "DP83916EB-AT: High Performance AT Compatible Bus Master Ethernet Adapter Card," Nov. 1992, 34 pp.

Vijay Mukhi et al., "Internet Control Message Protocol ICMP," www.vijaymukhi.com/vmis/icmp, last printed Sep. 6, 2006, 5pp.

Zvon, RFC 2072, [Router Renumbering Guide]—Router Identifiers, Chapter 8.3, Unnumbered Interfaces, www.zvon.org/tmRFC/RFC2072/output/chapter8.html , last printed on Nov. 7, 2005, 2 pp.

U.S. Appl. No. 13/730,737, filed Dec. 28, 2012, by Addepalli et al.

Prosecution History from U.S. Appl. No. 13/731,993, dated Dec. 31, 2012 through Aug. 20, 2014, 21 pp.

\* cited by examiner

NETWORK LIVELINESS DETECTION USING SESSION-EXTERNAL COMMUNICATIONS

This application is a continuation of U.S. patent application Ser. No. 13/731,993 filed Dec. 31, 2012, the entire contents of which is incorporated herein by reference.

TECHNICAL FIELD

This disclosure relates generally to computer networks, and more specifically, to periodic communications, such as communications used for network liveliness detection, between devices in a computer network.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes available routes through the network. Each route defines a path between two locations on the network. Upon receiving an incoming packet, the router examines information within the packet and forwards the packet in accordance with the routing information. In order to maintain an accurate representation of a network, routers maintain control-plane peering sessions through which they exchange routing or link state information that reflects the current topology of the network.

Routers typically send periodic packets to each other via the peering sessions to confirm connectivity and to indicate operational status of each device. These periodic packets are sometimes referred to as "keepalives" or "hellos." For example, a router may send periodic packets to a peer router every 50 milliseconds (ms) to indicate that the router is still operational. Likewise, the router may detect reception of corresponding periodic packets from the peer router within the same period of time (e.g., 50 ms). When a packet is not received in the allotted time frame, the router determines that a network event has occurred, such as failure of the peer router or failure of a link or node connecting the two routers. Consequently, the router may update various routing information to redirect network traffic and may issue a number of routing protocol update messages to neighboring routers indicating a topology change.

As one example, routers may exchange periodic packets by establishing a session provided by the bidirectional forwarding detection (BFD) protocol. In accordance with BFD, a first router periodically sends BFD packets at a negotiated transmission time interval and detects a connectivity failure when the router does not receive a BFD packet from a second router within session detection time interval. The transmission time interval for BFD may be negotiated by the routers. The BFD session detection time interval is not negotiated. Instead, each receiving router independently calculates BFD session detection interval based on the negotiated transmit interval and a detection multiplier statically configured for that router. For instance, a router may negotiate to receive BFD packets every 50 ms from a peer router and may independently utilize a detection multiplier of three (3) times that interval, i.e., 150 ms in this example, for detecting failure. If the receiving router does not receive a BFD packet from the peer router within the 150 ms session detection time interval, the receiving router detects a connectivity failure with respect to the second router. Consequently, the receiving router may update its routing information to route traffic around the second router. Further details of the BFD protocol may be found in "Bidirectional Forwarding Detection (BFD)," Internet Engineering Task Force, Request for Comments 5883, ISSN: 2070-1721, June, 2010, the entire content of which is incorporated herein by reference.

SUMMARY

In general, techniques of this disclosure are directed to monitor silence periods for a BFD session, based on traffic that is external to the BFD session. For example, a router engaged in an active BFD session identifies a packet as being "relevant" to the BFD session based on various criteria, such as whether the packet traverses across the BFD session end points. Additionally, the router uses the relevant packet to determine that the peer router in the BFD session is functional, and that the BFD session path between the router and the peer router is also functional. In various examples, the router may use packets that have a source and destination matching the router and peer router (the "BFD endpoints"), and packets that pass through one or both BFD endpoints in transit. Additionally, a relevant packet may conform to any protocol, including BFD, and may be part of packet-based traffic exchanged between the router and the peer router. A router may implement one or more techniques described herein to detect a relevant packet, and refresh a transmit timer or adjacency timer for the BFD session, without using a BFD packet generated specifically for the BFD session.

In one example, a method includes establishing, by a network device, a bidirectional forwarding detection (BFD) communication session with a peer network device that is communicatively coupled to the network device, determining, by a network device, whether a packet associated with a communication session other than the BFD communication session is a relevant packet to the BFD communication session, and in response to determining that the packet is the relevant packet, refreshing, by the network device, a timer that executes on the network device and is associated with the BFD communication session.

In another example, a network device includes a memory, programmable processor(s), a network interface, and a control unit. The control unit is configured to establish a bidirectional forwarding detection (BFD) communication session between the network device and a peer network device that is communicatively coupled to the network device via the network interface, determine whether a packet associated with a communication session other than the BFD communication session is a relevant packet to the BFD communication session, and in response to determining that the packet is the relevant packet, refresh a timer that executes on the network device and is associated with the BFD communication session.

In another example, a computer-readable storage medium is encoded with instructions. The instructions cause one or more programmable processors of a network device to establish a bidirectional forwarding detection (BFD) communication session between the network device and a peer network device that is communicatively coupled to the network device, determine whether a packet associated with a communication session other than the BFD communication session is a relevant packet to the BFD communication session, and in response to determining that the packet is the relevant packet, refresh a timer that executes on the network device and is associated with the BFD communication session.

The techniques of this disclosure provide one or more potential advantages. As one example, routers implementing the techniques may reduce traffic (or "load") on a network. More specifically, by refreshing BFD timers in response to traffic that is external to the BFD session, the routers avail of BFD-provided liveliness detection without generating traffic for the sole purpose of liveliness detection. As described above, routers participating in a BFD session may transmit BFD packets at relatively aggressive intervals, such as intervals in the order of milliseconds. By refreshing a BFD timer, such as a transmit timer, in response to a communication that is external to the BFD session, a router defers the transmission of the next BFD packet. When taken over an extended period of time, the cumulative deferral of several BFD packets may reduce network load substantially, thereby increasing available bandwidth for other traffic.

The details of one or more examples are set forth in the accompanying drawings and the description below. Other features, objects, and advantages of this disclosure will be apparent from the description and drawings, and from the claims.

DETAILED DESCRIPTION

Figure 1:
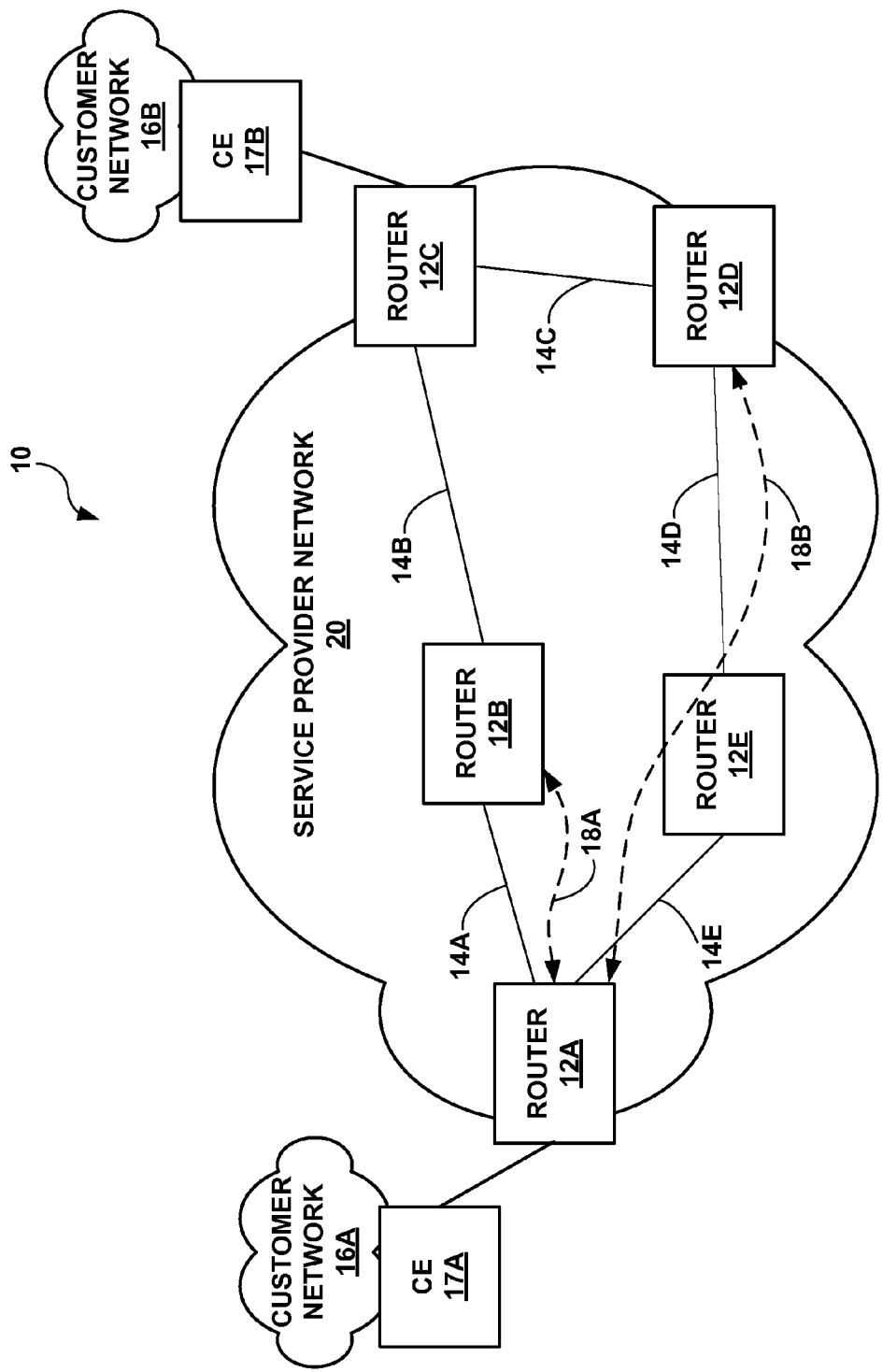
FIG. 1 is a block diagram illustrating an example network system in which techniques described herein may be implemented.

FIG. 1 is a block diagram illustrating an example network system 10 in which techniques described herein may be implemented. Network system 10 includes service provider network 20, which is communicatively coupled to customer networks 16A and 16B ("customer networks 16"). In turn, service provider network 20 includes routers 12A-12E ("routers 12"), which operate and interact with one another in accordance with the techniques described herein. Routers 12 are communicatively coupled to one another, either directly, or indirectly, via physical links 14A-14E ("links 14"). Links 14 represent any physical medium, such as a copper wire, a coaxial cable, any of a host of different fiber optic lines, a wireless connection, and various combinations thereof. In the specific example of FIG. 1, routers 12A and 12C represent edge routers. More specifically, routers 12A and 12C provide an interface between service provider network 20 and respective customer networks 16.

Additionally, customer networks 16 include respective customer edge routers 17A and 17B ("CE routers 17"). As shown, each of CE routers 17 is linked to a respective edge router of routers 12. Edge routers 12A and 12C communicate with CE routers 17 to provide customer networks 16 with access to service provider network 20. As shown, each of customer networks 16 may be a network for a site of an enterprise. Each of customer networks 16 may include one or more computing devices (not shown), such as personal computers, laptop computers, handheld computers, workstations, servers, switches, printers, or other devices. Service provider network 20 may be coupled to one or more networks administered by other service providers, and may thus form part of a large-scale public network infrastructure, e.g., the Internet. Consequently, customer networks 16 may be viewed as edge networks of the Internet.

The service provider may provide computing devices within customer networks 16 with access to the Internet via service provider network 20, which allows computing devices within one of customer networks 16 to communicate with computing devices within the Internet or the other one of customer networks 16. FIG. 1 may be a simplified view of network system 10. For instance, service provider network 20 can include a variety of other network devices (not shown), such as routers, switches, servers, and the like and may be connected to other networks.

In contrast to edge routers 12A and 12C, the remainder of routers 12 represents intermediate routers. More specifically, intermediate routers 12B, 12D, and 12E provide various communication channels between edge routers 12A and 12C. It will be appreciated that edge routers 12A and 12C also perform intermediate routing functionalities, as shown, for example, by the link that edge router 12A provides between intermediate routers 12B and 12E. Similarly, any of intermediate routers 12B, 12D, and 12E is capable of performing edge router functionalities by connecting to another device, such as an edge router of another network.

Routers 12 communicate in accordance with one or more control-plane protocols to maintain accurate representation of the topology of service provider network 20. For example, routers 12 maintain peering sessions with each other and exchange routing information for routes or links within service provider network 20 in accordance with a routing protocol. Example protocols include the Border Gateway Protocol (BGP) distance vector routing protocol and the Open Shortest Path First (OSPF) and Intermediate System-to-Intermediate System (IS-IS) link state routing protocols.

In addition to exchanging session messages to convey network topology information, routers 12 periodically send status inquiries (e.g., send "periodic packets" or "periodic data") to one another in order to monitor the state of the other devices. That is, by sending periodic inquiries and detecting receipt of similar periodic inquiries, routers 12 detect any failures in communicating data between each other, either as a result of failure of one or more of routers 12 or of links 14 between them. Upon detecting such a failure, the detecting router 12 updates one or more internal representations of the topology of service provider network 20, and outputs session messages to the other routers 12 to inform the other routers 12 of the topology changes.

Typically, the length of time between which routers 12 transmit the periodic data or messages to one another correlates directly to the speed at which routers 12 detect any failure in communications between one another and thus update the respective representation of the topology of service provider network 20 to respond to the failure. For this reason, routers 12 are frequently configured to seek receipt of consecutive periodic inquiries within a relatively short length of time, e.g., within a few seconds or even in the order of milliseconds (ms).

One exemplary protocol, referred to as the bidirectional forwarding detection (BFD) protocol, is commonly used between two routing devices in order for each router to closely monitor the state (e.g., health) of the other routing device. For example, two of routers 12 that exchange routing information via the OSPF or ISIS routing protocols establish a BFD session for sending and responding to status inquiries in the form of Hello packets, either asynchronously or when needed (e.g., as in the BFD Demand Mode). In either case, the BFD protocol provides a very short interval of time between which routers 12 must transmit periodic messages, and thus may facilitate the quicker detection of failures by routers 12 that are in an active BFD session.

Although described herein with reference to the BFD protocol, the techniques may apply to any protocol allowing for periodic messages for inquiring as to the status of a peering device. Further, the techniques may be applicable to routers 12 that use these periodic communications for media access control (MAC) layer protocols, such as the frame relay Local Management Interface (LMI), point-to-point (PPP) protocol. Moreover, the techniques further include instances where routers 12 employ the BFD protocol in conjunction with any of the above protocols, as well as, protocols not contemplated herein. In these instances, routers 12 may employ the BFD protocol for detecting failures and the other protocol for other routing functions, such as route resolution.

In the example of FIG. 1, various pairs of routers 12 exchange periodic messages in accordance with the BFD protocol. The BFD protocol enables each of routers 12 to negotiate an interval for each BFD session. In other words, router 12A may negotiate a BFD session 18A with router 12B, and network devices 12A, 12B may establish a 10 ms interval for BFD session 18A. Meanwhile, router 12A may negotiate a second BFD session 18B with router 12D. In this example, routers 12A and 12D may establish a response interval of 100 ms for BFD session 18B. As illustrated through the example of router 12A, a single router may participate in multiple BFD sessions, even if the BFD sessions have different attributes. Each of routers 12A, 12B, and 12D execute one or more BFD timers. For example, each of routers 12A, 12B, and 12D executes a transmission (or "transmit") timer and a detection (or "adjacency") timer. Each transmit timer measures intervals for the respective router 12 to transmit a BFD packet over a particular session, and triggers transmission of a BFD packet upon reaching the negotiated interval. In the example of FIG. 1, router 12A executes two transmit timers, one for each of BFD sessions 18A and 18B.

Each adjacency timer measures intervals between received BFD packets over a BFD session. Using the adjacency timer, routers 12 determine the status of a connection corresponding to a BFD session. For instance, routers 12 often use the adjacency timer to determine a session detection time. If a particular router 12 does not receive a BFD packet within the session detection time, the particular router 12 detects a network event, such as a failure of the link associated with the BFD session. In many instances, routers 12 set the timer to a multiple (e.g., an integer multiple) of the negotiated interval for received BFD packets, such as a value of (3*Interval) ms. In examples, the negotiated interval for receiving BFD packets corresponds to the negotiated transmit interval of the peer router in the BFD session.

In the examples described above, the different intervals negotiated with respect to BFD sessions 18A and 18B reflect the nature of the connections between the respective sets of routers in each of between BFD sessions 18A and 18B. For instance, BFD session 18A corresponds to a direct connection (over link 14A) between routers 12A and 12B. In other words, BFD packets sent over BFD session 18A are not routed through an intermediate router. In contrast, BFD session 18B represents a so-called "multi-hop" BFD session. More specifically, BFD session 18B is established between routers 12A and 12D, which are not directly coupled by a physical link. Instead, routers 12A and 12D communicate through intermediate router 12E.

As a result, the respective pairs of routers 12 that establish BFD sessions 18A and 18B negotiate transmit and/or receipt intervals that are suited to the nature of the link between them. In turn, router 12A may set a session detection time based on the receipt interval to determine a failure associated with router 12B using BFD session 18A.

Each of routers 12 may also negotiate a device-specific transmit interval. In other words, the transmit interval can vary for each router 12 of BFD session 18B. For instance, during BFD session 18B, router 12D may transmit a BFD packet every 10 ms, while router 12A may transmit a BFD packet every 15 ms. In turn, router 12A may implement a BFD adjacency timer with a receipt interval of 10 ms, and router 12D may implement a BFD adjacency timer with a receipt interval of 15 ms. This notion of device-specific intervals explains the "bidirectional" or "B" of the "BFD" protocol, as the periodic messages can be controlled differently in each direction.

These examples illustrate the aggressive intervals that the transmit timers of routers 12 may define for BFD sessions 18. By setting aggressive intervals, the transmit timers enable routers 12 to monitor the liveliness of the respective devices and links represented by BFD sessions 18 closely. However, by transmitting BFD packets at such aggressive intervals, routers 12 may generate significant traffic (or "load") over service provider network 20, by virtue of participating in BFD sessions 18.

To mitigate the load that BFD sessions 18 impose on service provider network 20, routers 12 may implement one or more techniques of this disclosure to identify communications that are "relevant" to BFD sessions 18, and defer transmission of BFD packets based on the detection of any relevant communications. In this way, the techniques described herein may be applied to inject BFD communications over BFD sessions 18 only when necessary based on the duration of silence periods between routers 12, i.e., durations of time for which no other relevant communications have been detected that may serve the purpose of indicating connectivity between the BFD endpoints. In a specific example, router 12A may in some cases identify a packet that is external to BFD session 18A as being relevant to BFD session 18A and, therefore defer transmission of a BFD packet on the session for a period of time. That is, in this example, router 12A determines that successful transmission of the relevant packet to router 12B has served the function of a transmission of a BFD packet over BFD session 18A and, as such, transmission of the BFD packet can be deferred. In other words, if router 12A transmits the identified relevant packet, and router 12B receives and coherently identifies the relevant packet, the communication is equivalent to the successful transmission and receipt of a BFD packet over BFD session 18A.

In this example, router 12A refreshes the transmit timer for BFD session 18A upon transmitting the identified relevant packet. In other words, router 12A utilizes the identified relevant packet as a substitute BFD packet for BFD session 18A. By refreshing the transmit timer in response to transmitting the relevant packet, router 12A may defer the transmission of the next BFD packet over BFD session 18A. In an example where the transmit timer executing on router 12A for BFD session 18A defines a transmission interval of 15 ms, if router 12A refreshes the transmit timer after 14 ms have elapsed, router 12A effectively increases the transmit interval to 29 ms. If router 12A detects additional relevant packets before expiration of the transmit timer, router 12A is configured to defer transmission of the next BFD packet even further. Conversely, if router 12A does not transmit a packet identified as relevant to BFD session 18A within expiration of the transmit timer, router 12A proceeds to transmit a BFD packet over BFD session 18A. In this manner, router 12A implements the techniques of this disclosure to reduce the number of BFD packets transmitted, while still availing of liveliness detection functionalities of the BFD protocol using identified relevant packets.

Routers 12A and 12B may implement the techniques of this disclosure using matching definitions of relevant packets. In some examples, the BFD endpoints (in this case, routers 12A and 12B) of the session may negotiate definitions of relevant packets and the techniques used to coherently detect the relevant packets. Additionally, routers 12A and 12B may negotiate and synchronize relevant packet detection schemes during an establishment phase of BFD session 18A. More specifically, relevant packet detection at both the transmitter ("Tx") and receiver ("Rx") end points of a BFD session is considered to be "coherent" if every packet that is detected/classified as a "relevant packet" for a session by the Tx router (e.g., prior to or at a time of transmission) is also detected/classified as a "relevant packet" by the Rx router (e.g., at or subsequent to a time of receipt) for the BFD session, and vice versa. In some examples, router 12A modifies the relevant packet before transmission to router 12B, to include an indication in the relevant packet for router 12B to refresh the adjacency timer.

In various examples, routers 12A and 12B may negotiate the relevant packet detection schemes by exchanging messages. For instance, router 12A may generate a message that proposes a detection scheme based on matching IP addresses specified in a packet to IP addresses associated with routers 12A and 12B. In another example, router 12B may generate a message that proposes a detection scheme based on matching particular interfaces and/or links to the endpoints of BFD session 18A. In some examples, routers 12A and 12B may include specific information pertaining to the detection scheme (e.g., specific algorithms). Upon receiving a message proposing a detection scheme, routers 12A and 12B may implement the proposed detection scheme, thereby synchronizing the detection schemes and coherently detecting session-external packets as being relevant to BFD session 18A.

Routers 12A and 12B may identify a variety of communications as being relevant to BFD session 18A. Examples include packets exchanged between routers 12A and 12B over the control-plane and forwarding traffic exchanged between routers 12A and 12B. An example of a control-plane packet is a packet provided by the border gateway protocol (BGP) executing on routers 12A and 12B. In this manner, the BGP packets sourced by router 12A and destined for router 12B may be detected by the routers and used to reset the BFD transmit timer of router 12A and, upon receipt, the BFD adjacency timer of router 12B. Additionally, routers 12 may frequently identify transit packets exchanged between routers 12A and 12B, as BFD sessions are often established between routers that exchange forwarding traffic. In some instances, routers 12A and 12B may identify BFD packets that belong to BFD sessions other than BFD session 18A as being relevant to BFD session 18A. As one example, router 12A establishes a BFD session with a peer router (not shown for purposes of clarity only) with which router 12A can only communicate by way of router 12B. In this example, routers 12A and 12B may identify BFD packets that router 12A exchanges with the peer router as being relevant to BFD session 18A. In this manner, routers 12 may implement the techniques of this disclosure to use a wide variety of communications as relevant packets, potentially reusing a high proportion of existing traffic for liveliness detection purposes, and reducing network load due to BFD packets substantially.

In various examples, routers 12 implement the techniques of this disclosure to identify relevant packets that have source and destination points that match the BFD endpoints, or relevant packets that traverse a BFD session's path as part of a different path. In one example, router 12A identifies an outgoing ("egress") packet as being relevant to BFD session 18A, based on the egress packet being sourced at router 12A and destined for router 12B. As described, routers 12A and 12B may exchange substantial levels of data traffic, and hence use BFD session 18A to monitor the reliability of physical link 14A. In this example, router 12A determines that the source of the egress packet matches an internet protocol (IP) address associated with an interface of router 12A. Additionally, router 12A determines that the destination of the egress packet matches an IP address associated with an interface of router 12B.

In this example, router 12A determines that the source and destination IP addresses match the interfaces that form the BFD endpoints of BFD session 18A. In turn, router 12A determines that the egress packet is relevant to BFD session 18A.

Additionally, router 12B is configured to identify the corresponding incoming ("ingress") packet as relevant to BFD session 18A. Based on transmission and receipt, respectively, of the relevant packet, router 12A refreshes the transmit timer and router 12B refreshes the adjacency timer for BFD session 18A. In examples, each of router 12A and router 12B may implement multiple interfaces, such as so-called "logical interfaces," each associated with a different IP address. In such instances, routers 12A and 12B identify the packet as relevant to BFD session 18A only if the source and destination IP addresses of the packet match the particular logical interfaces that form the endpoints of BFD session 18A.

In other examples, router 12A implements the techniques described herein to identify a packet as relevant to BFD session 18A if the packet traverses a path that includes the path defined by BFD session 18A. For instance, router 12A may identify, as relevant to BFD session 18A, a packet that is sourced at router 12E and is destined for router 12B. In this example, router 12A receives the packet from router 12E over physical link 14E, and determines that a destination IP address specified in the packet header matches the IP address associated with the logical interface of router 12B that forms an endpoint of BFD session 18A. Additionally, router 12A determines that the logical interface from which router 12A transmits the packet matches the IP address of the other endpoint of BFD session 18A. Based on matching both endpoints of BFD session 18A, router 12A determines the "transit" packet to be relevant to BFD session 18A, and stamps the packet as relevant prior to transmitting the packet to router 12B. For example, the stamp may be a session ID that uniquely identifies the packet to a BFD session at the receiving router. In some examples, the session ID may include or otherwise be associated with a BFD discriminator or an IP address of an end point router of the BFD session.

The above example describes a transit packet that is relevant to a single-hop BFD session. In other scenarios, routers 12 implement techniques of this disclosure to identify a transit packet as relevant to a multi-hop BFD session, such as BFD session 18B. As one example, router 12D may identify a transit packet forwarded through router 12D as relevant to BFD session 18B. For instance, router 12D may receive a packet sourced by router 12C, with a destination IP address matching a logical interface of router 12A. In this example, router 12D matches the destination IP address of the packet to that of the other end point of the BFD session 18B. Based on matching the transit packet's destination IP address to the endpoint of BFD session 18B, router 12D identifies the transit packet as relevant to BFD session 18B.

In contrast to identifying a transit packet as relevant to a single-hop BFD session, in the case of a multi-hop BFD session, routers 12 do not match the egress logical interface to the particular logical interface of the BFD session. Instead, in the case of transit packets in multi-hop BFD session scenarios, routers 12 match the destination IP address to the BFD endpoint, and identify the transit packet as relevant based on the transit packet passing through the transit router. In this manner, techniques of this disclosure enable routers 12 to identify packets as relevant to BFD sessions based on criteria that suit the path of the packet as well as the nature of the particular BFD session. By monitoring the relevant packet traffic and injecting BFD packets gracefully so as to maintain the maximum silence period on any BFD session to be less than the configured thresh hold time, routers 12 implement one or more techniques of this disclosure to reduce traffic load caused by periodic transmission of BFD packets, while maintaining liveliness detection provided by the BFD protocol.

Figure 2:
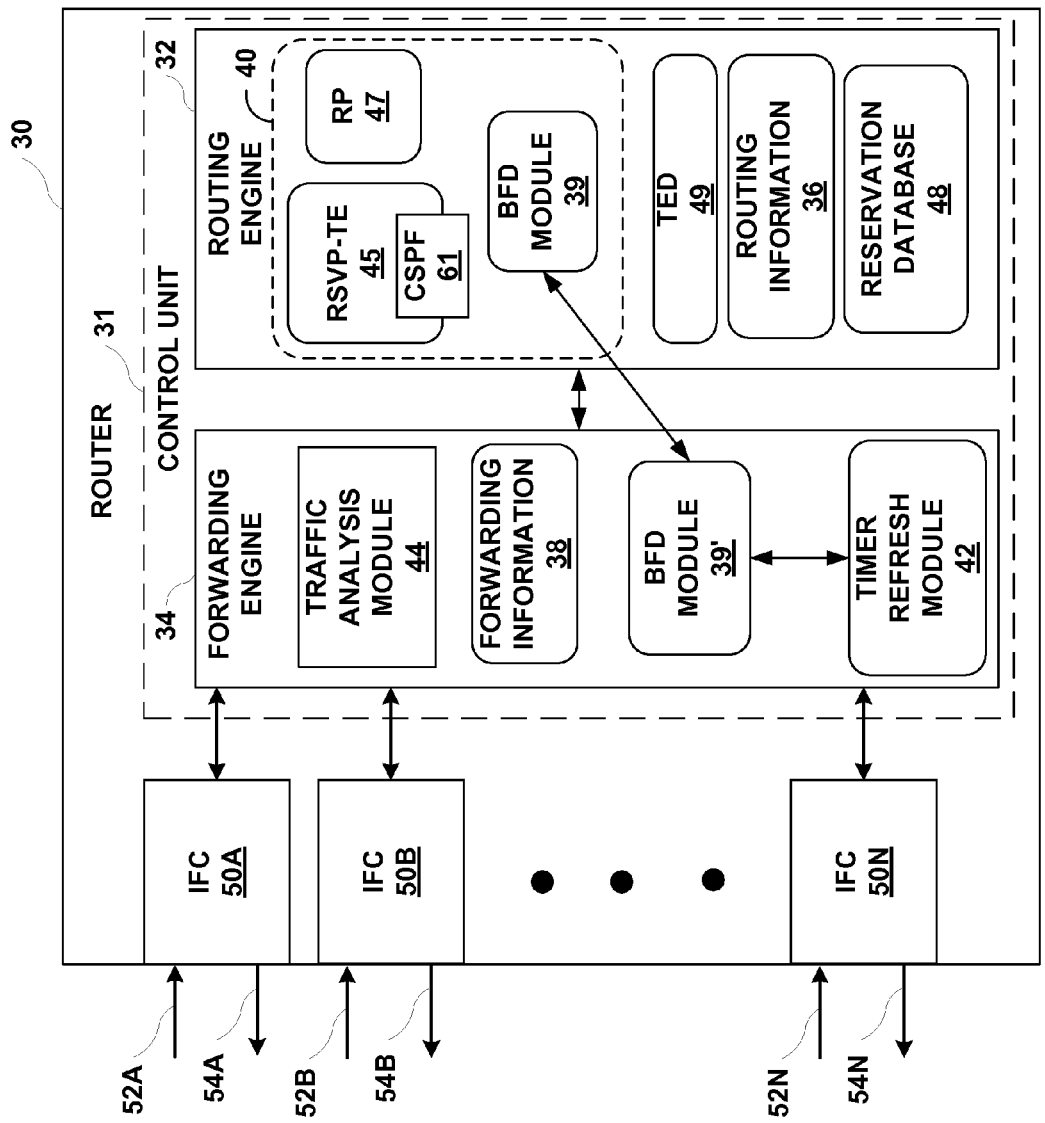
FIG. 2 is a block diagram illustrating an exemplary router in accordance with the disclosure herein.

FIG. 2 is a block diagram illustrating an exemplary router 30 in accordance with the disclosure herein. Router 30 is one example implementation of any of routers 12 illustrated in FIG. 1. While router 30 illustrates one possible router implementation to perform the techniques described herein, it will be appreciated that various other implementations are possible in accordance with this disclosure.

In this example, router 30 includes a control unit 31 that comprises a routing engine 32 and a forwarding engine 34. In addition, router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing engine 32 primarily provides an operating environment for control plane protocols, such as those included in protocols 40. For example, one or more routing protocols ("RP") 47 maintain routing information 36 to reflect the current topology of a network and other network entities to which it is connected. In particular, RP 47 updates routing information 36 to accurately reflect the topology of the network and other entities. Example routing protocols include Multi-Protocol Border Gateway Protocol (mpBGP), the Intermediate System to Intermediate System (ISIS) routing protocol, the Open Shortest Path First (OSPF) routing protocol and the like.

Routing engine 32 generates and programs forwarding engine 34 with forwarding information 38 that associates network destinations with specific next hops and corresponding interface ports of IFCs 50 in accordance with routing information 36. Routing engine 32 may generate forwarding information 38 in the form of a radix tree having leaf nodes that represent destinations within the network.

Based on forwarding information 38, forwarding engine 34 forwards packets received from inbound links 52A-52N to outbound links 54A-54N that correspond to next hops associated with destinations of the packets. U.S. Pat. No. 7,184, 437 provides details on an exemplary embodiment of a router that utilizes a radix tree for route resolution, the contents of which is incorporated herein by reference in its entirety.

In one example, forwarding engine 34 is a rich and dynamic shared forwarding plane, optionally distributed over a multi-chassis router. Moreover, forwarding plane 34 may be provided by dedicated forwarding integrated circuits normally associated with high-end routing components of a network router. Further details of one example embodiment of router 30 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," which is incorporated herein by reference.

As shown in FIG. 2, protocols 40 executing within routing engine 32 include one or more MPLS protocols for router-to-router communications. For example, Resource Reservation Protocol-Traffic Engineering (RSVP-TE) 45 may generate and maintain a traffic engineering database 49, including bandwidth reservations for paths associated with a network, such as service provider network 20 of FIG. 1. Constrained Shortest Path First (CSPF) process 61 computes a shortest path or paths for a communication session based on specified constraints and bandwidth availability information associated with the links within the network. RP 47 may, in turn, advertise the calculated bandwidth availability information in TED 49 to other peer routers.

Moreover, as shown in FIG. 2, protocols 40 include BFD module 39 that is enhanced in accordance with the techniques described herein. For example, BFD module 39, in conjunction with other components of router 30, is configured to dynamically refresh one or both of a transmit timer and an adjacency timer based on identifying packets external to a BFD session as being relevant to the BFD session. Additionally, BFD module 39 of routing engine 32 may program BFD module 39' in forwarding engine 34 or similar logic (not shown) in any of IFCs 50 that utilize BFD protocol-based logic to monitor incoming BFD packets and report a failed connection with another router to routing engine 39.

More specifically, BFD module 39' implements BFD protocol-based functionalities, such as transmitting and monitoring for periodic BFD packets received by forwarding engine 34, thereby conserving resources that would otherwise be expended by routing engine 32. In case of a detected connectivity failure, BFD module 39' is configured to transmit a failure notification, or other similar indication, to BFD module 39 of routing engine 32. In response to receiving the failure notification from BFD module 39' of forwarding engine 34, BFD module 39 causes RP 47 to update the network topology currently stored to routing information 36, to reflect the failed link(s) represented by the BFD failure.

As shown in FIG. 2, forwarding engine 34 also includes timer refresh module 42, which is communicatively coupled to BFD module 39'. While shown separately from BFD module 39' for purposes of clarity, in various examples, timer refresh module 42 may be included in BFD 39', or may be implemented in other components of router 30. In various implementations, the functionalities described herein with respect to timer refresh module 42 may be divided among multiple modules, such as a dedicated relevant packet detector and a dedicated timer refresher. Timer refresh module 42 is configured to refresh the respective BFD session timers based on inputs from traffic analysis module 44 related to the detected relevant packets.

In scenarios where router 30 participates in a BFD session with a peer router, BFD modules 39 and 39' transmit periodic BFD packets, as well as monitor time intervals between ingress BFD packets from the peer router over the BFD session. One or both of BFD modules 39 and 39' are configured to execute a transmit timer and an adjacency timer, which BFD module 39' uses to trigger transmission of egress BFD packets, and monitor for receipt of ingress BFD packets over the BFD session. Traffic analysis module 44 of forwarding engine 34 is configured to identify relevant packets for the BFD session, and based on detecting the transmission or receipt of a relevant packet, cause timer refresh module 42 to refresh the transmit timer or the adjacency timer, respectively.

In some examples, traffic analysis module 44 detects that an egress control-plane packet generated by routing engine 32, and/or components thereof, is relevant to a particular BFD session executed by BFD modules 39 and 39'. As one example, traffic analysis module 44 detects that the source IP address specified in the header of the packet matches the IP address of the particular logical interface of router 30 that is associated with the BFD session. In this example, traffic analysis module 44 also determines that the destination IP address specified in the packet header matches the IP address of the particular logical interface of the peer router through which the peer router participates in the BFD session. Based on the source and destination IP addresses in the packet header matching the BFD endpoints, traffic analysis module 44 identifies the packet as being relevant to the BFD session. Upon router 30 transmitting the relevant egress packet to the peer router, timer refresh module 42 refreshes the transmit timer for the particular BFD session. In this manner, timer refresh module 42 defers transmission of the next BFD packet for the particular BFD session, thereby reducing network load caused by the BFD session.

In the example described above, traffic analysis module 44 identifies a packet as being relevant to a BFD session based on the source and destination IP addresses of the packet matching the BFD session endpoints. In other instances, traffic analysis module 44 may identify a transit packet as a relevant packet. More specifically, traffic analysis module 44 identifies, as relevant to the BFD session, a packet that forwarding engine 34 receives, with instruction to forward the packet to another router. For instance, forwarding engine 34 may receive a packet, with header information indicating a destination IP address that matches the peer router logical interface of the BFD session.

Additionally, traffic analysis module 44 may use routing information 36 and/or forwarding information 38 to determine that the forwarding path of the packet to the peer router matches the path monitored by the BFD session. In this example, timer refresh module 42 refreshes the transmit timer executed by BFD modules 39 and/or 39' upon router 30 transmitting the relevant packet to the peer router. Additionally, one or both of timer refresh module 42 and traffic analysis module 44 cause BFD module 39' to stamp the packet as relevant. As one example, BFD module 39' may stamp the packet by modifying the packet to include identification of the logical interface IP address from which router 30 transmits the packet. By stamping the packet as relevant, timer refresh module 42, traffic analysis module 44, and BFD module 39' enable the peer router to identify the packet as relevant upon receipt, and refresh an adjacency timer for the BFD session. In this manner, techniques of this disclosure enable peer routers in a BFD session to negotiate and synchronize algorithms for relevant packet identification, and thereby update transmit and adjacency timers in response to parallel stimuli.

The architecture of router 30 illustrated in FIG. 2 is shown for exemplary purposes only. In other implementations, router 30 may be configured in a variety of ways. In one example, control unit 31 and its corresponding functionality may be distributed within IFCs 50. Control unit 31 may be implemented solely in software, or hardware, or may be implemented as a combination of software, hardware, or firmware. For example, control unit 31 may include one or more processors which execute software instructions. In that case, the various software modules of control unit 31, such as protocols 40, may comprise executable instructions stored on a computer-readable medium, such as one or more of computer memory, computer readable-storage devices (e.g., hard disks and/or solid-state disks), or non-transitory computer-readable media.

Figure 3:
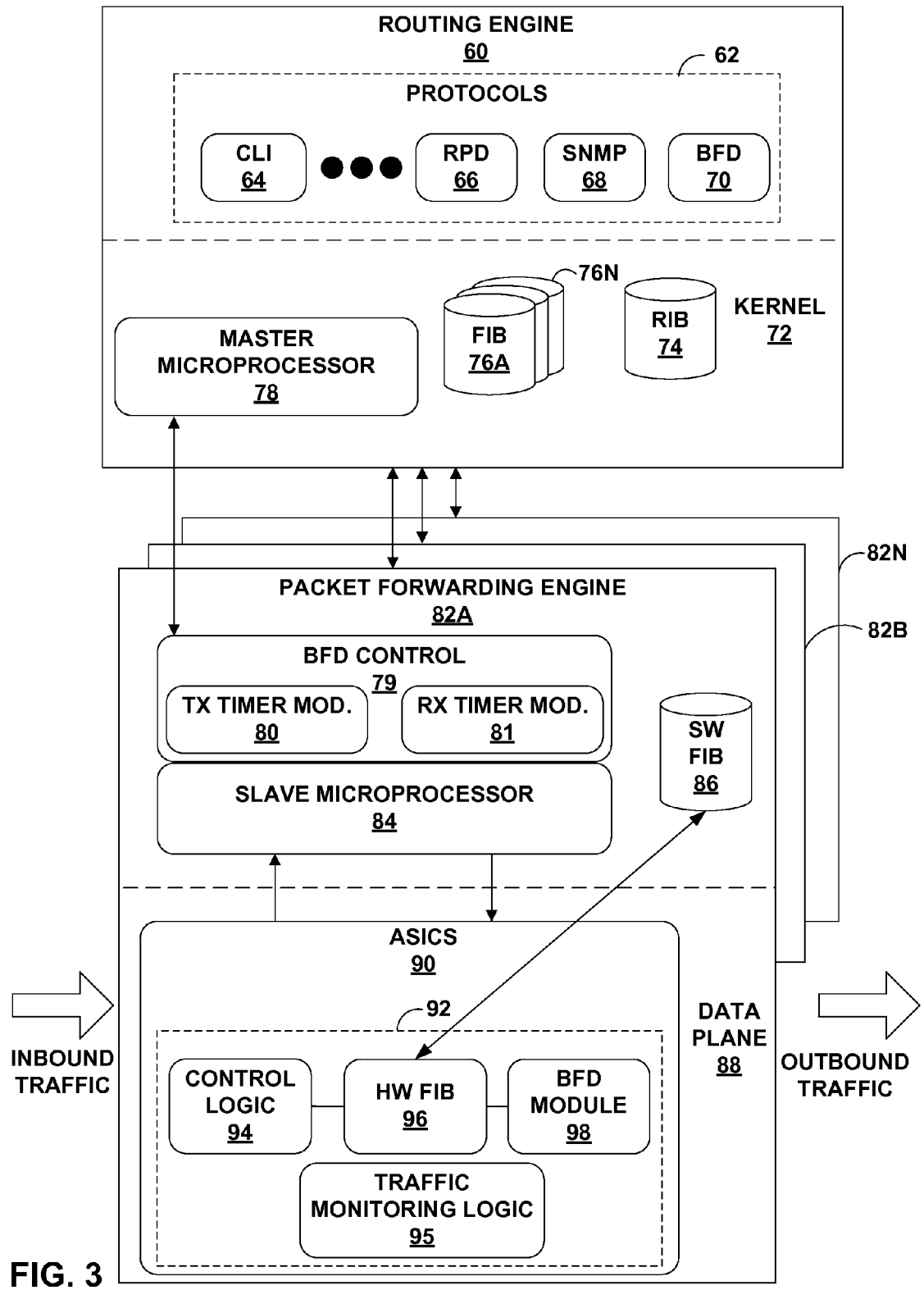
FIG. 3 is a block diagram illustrating further details of a routing engine and a packet-forwarding engine of a router, in accordance with one or more aspects of this disclosure.

FIG. 3 is a block diagram illustrating further details of a routing engine 60 and a packet-forwarding engine 82 of router 30 of FIG. 2 in further detail. Routing engine 60 includes high-level, control plane software processes 62. In this example, software processes include command-line interface daemon 64 ("CLI 64"), routing protocol daemon 66 ("RPD 66"), and Simple Network Management Protocol daemon 68 ("SNMP 68"). In this respect, routing engine 60 may provide routing plane, service plane, and management plane functionality for router 30. Various instances of routing engine 60 may include additional software processes 62 not shown in FIG. 3 that perform other control, management, or service plane functionality and/or drive and otherwise manage data plane functionality for router 30.

RPD 66 interacts with kernel 72 (e.g., by way of API calls) to update routing information base (RIB) 74 based on routing protocol messages received by router 30. RPD 66 may, for example, execute various routing protocols, such as Label Distribution Protocol (LDP) and Resource Reservation Protocol (RSVP) for establish Label Switched Paths (LSPs) within a network. RIB 74 may include information defining a topology of a network, including one or more routing tables and/or link-state databases. Kernel 72 executes on master microprocessor 78 and may comprise, for example, a UNIX operating system derivative such as Linux or Berkeley Software Distribution (BSD). Kernel 72 processes kernel calls from RPD 66 and generates forwarding information in the form of FIBs 76A-76N based on the network topology represented in RIB 74, i.e., performs route resolution. Typically, RPD 66 generates FIBs 76 in the form of radix or other lookup trees to map packet information (e.g., header information having destination information and/or a label stack) to next hops and ultimately to interface ports of interface cards associated with respective PFEs 82. Master microprocessor 78 of kernel 72 then programs PFEs 82 to install copies of the FIBs as software FIBs 86A-86N. Microprocessor 78 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Command line interface daemon 64 ("CLI 64") provides an interface by which an administrator or other management entity may modify the configuration of router 30 using text-based commands. Simple Network Management Protocol daemon 68 ("SNMP 68") comprises an SNMP agent that receives SNMP commands from a management entity to set and retrieve configuration and management information for router 30. BFD 70 implements BFD protocol-based functionalities in the control-plane of router 30, such as using BFD packet data to update RIB 74 and FIBs 76. Using CLI 64, SNMP 68, and BFD 70, management entities may enable/disable and configure services, install routes, enable/disable and configure rate limiters, and configure interfaces, for example. RPD 66, CLI 64, SNMP 68, and BFD module 70 configure router 30 to implement configured services, add/modify/delete routes, and otherwise modify packet forwarding paths by installing forwarding structures to PFEs 82.

In this example, ASICs 90 are microcode-controlled chipsets programmably configured by a slave microprocessor 84 executing on each of PFEs 82A-82N (e.g., PFE 82A). Specifically, one or more of ASICs 90 is controllable by microcode 92 programmed by slave microprocessor 84. The slave microprocessor 84 programs a hardware FIB 96 into internal memory of ASIC 90 within the data plane 88 based on software FIB 86. When forwarding packets, control logic 94 traverses HW FIB 96 and, upon reaching a FIB entry for the packet (e.g., a leaf node), microcode-implemented control logic 94 automatically selects a forwarding next hop and processes the packets in accordance with the operations defined within the next hop. Additionally, microcode 92 includes BFD module 98, which implements various functionalities in accordance the BFD protocol. As examples, BFD module 98 implements one or more of the adjacency timer, the expiration of which triggers a failure detection of link to another router, and a BFD counter, which maintains a count of BFD packets received as part of a BFD session. As shown, microcode 92 also includes traffic monitoring logic 95, which implements one or more techniques of this disclosure, such as identifying session-external packets as being relevant to one or more BFD sessions.

In accordance with the techniques described herein, slave microprocessor 84 implements BFD control 79. BFD control 79 combines with traffic monitoring logic 95 to implement one or more of the relevant packet identification and timer refresh operations described herein. As examples, traffic monitoring logic 95 is configured or otherwise operable to identify a packet as relevant to a BFD session based on criteria such as a source IP address and/or a destination IP address indicated in control data (e.g., the header) of the packet. Traffic monitoring logic 95 is additionally configured to communicate information pertaining to relevant packet identification to BFD control 79. In some examples where packet forwarding engine 82A transmits a relevant packet to a peer router, BFD control 79 stamps the relevant packet to indicate to the peer router that the packet is relevant to one or more particular BFD sessions.

As shown, BFD control 79 includes transmit (Tx) timer module 80 and receipt (Rx) timer module 81. Tx timer module 80 is configured to refresh a transmit timer executed by microcode-implemented BFD module 98, in response to BFD control 79 detecting transmission of a relevant packet identified by traffic monitoring logic 95. Similarly, Rx timer module 81 is configured to refresh an adjacency timer executed by microcode-implemented BFD module 98, in response to BFD control 79 detecting receipt of a relevant packet identified by traffic monitoring logic 95. Specific implementations are described in greater detail with reference to FIGS. 4A-4C below.

Figure 4A:
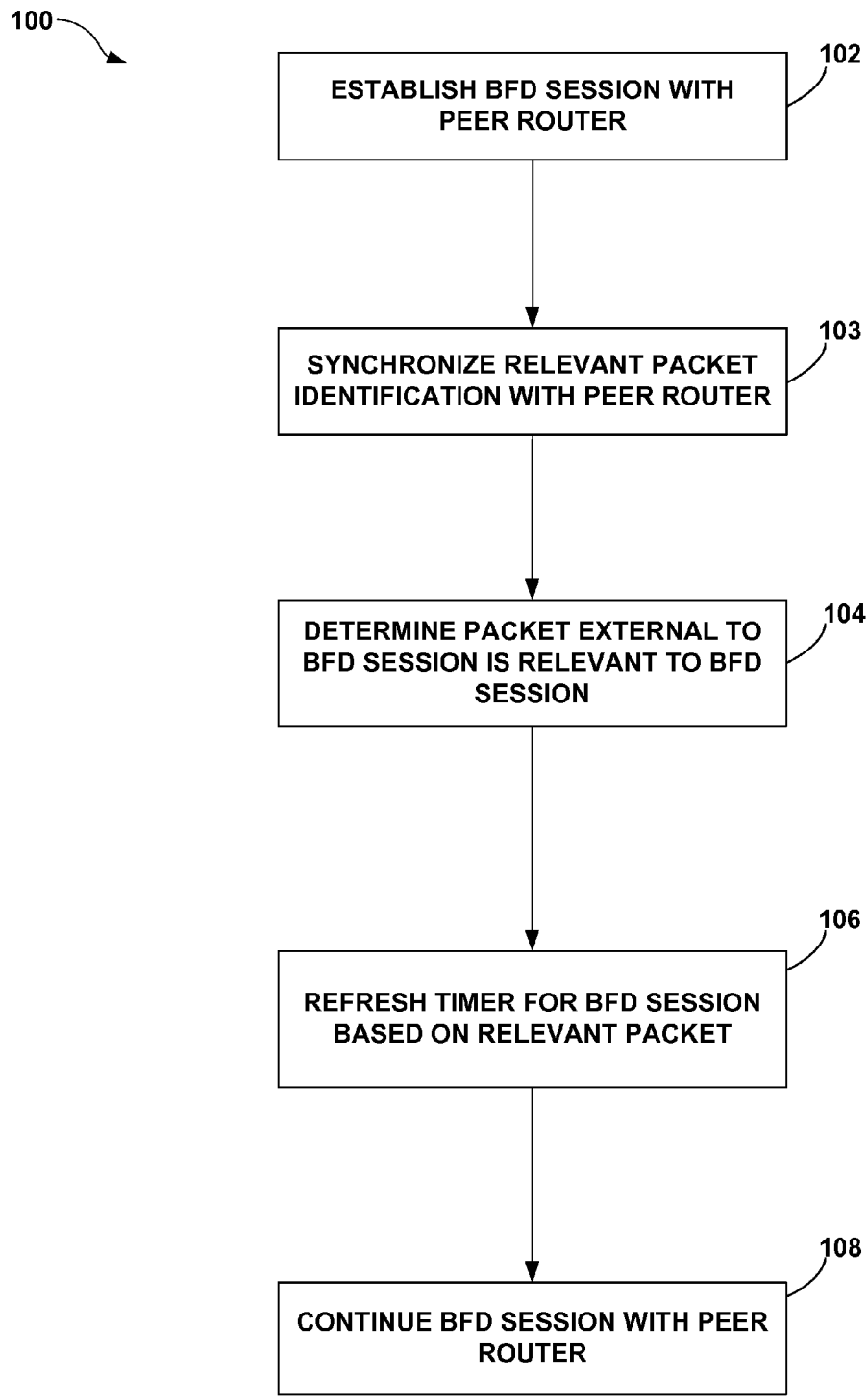
FIGS. 4A-4C are flowcharts illustrating example processes by which a router participates in a BFD session with a peer router, in accordance with one or more aspects of this disclosure.
Figure 4B:
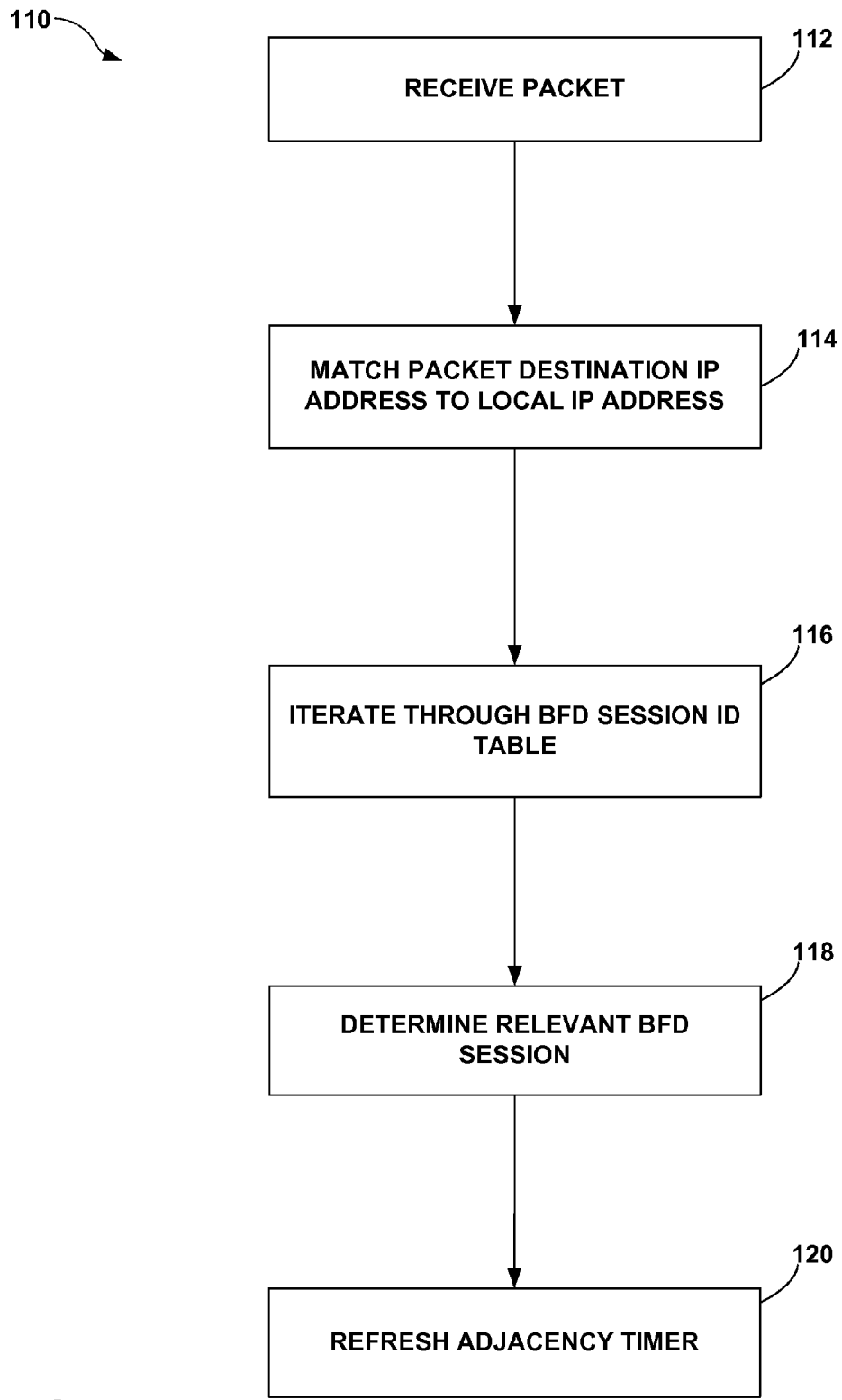
Figure 4C:
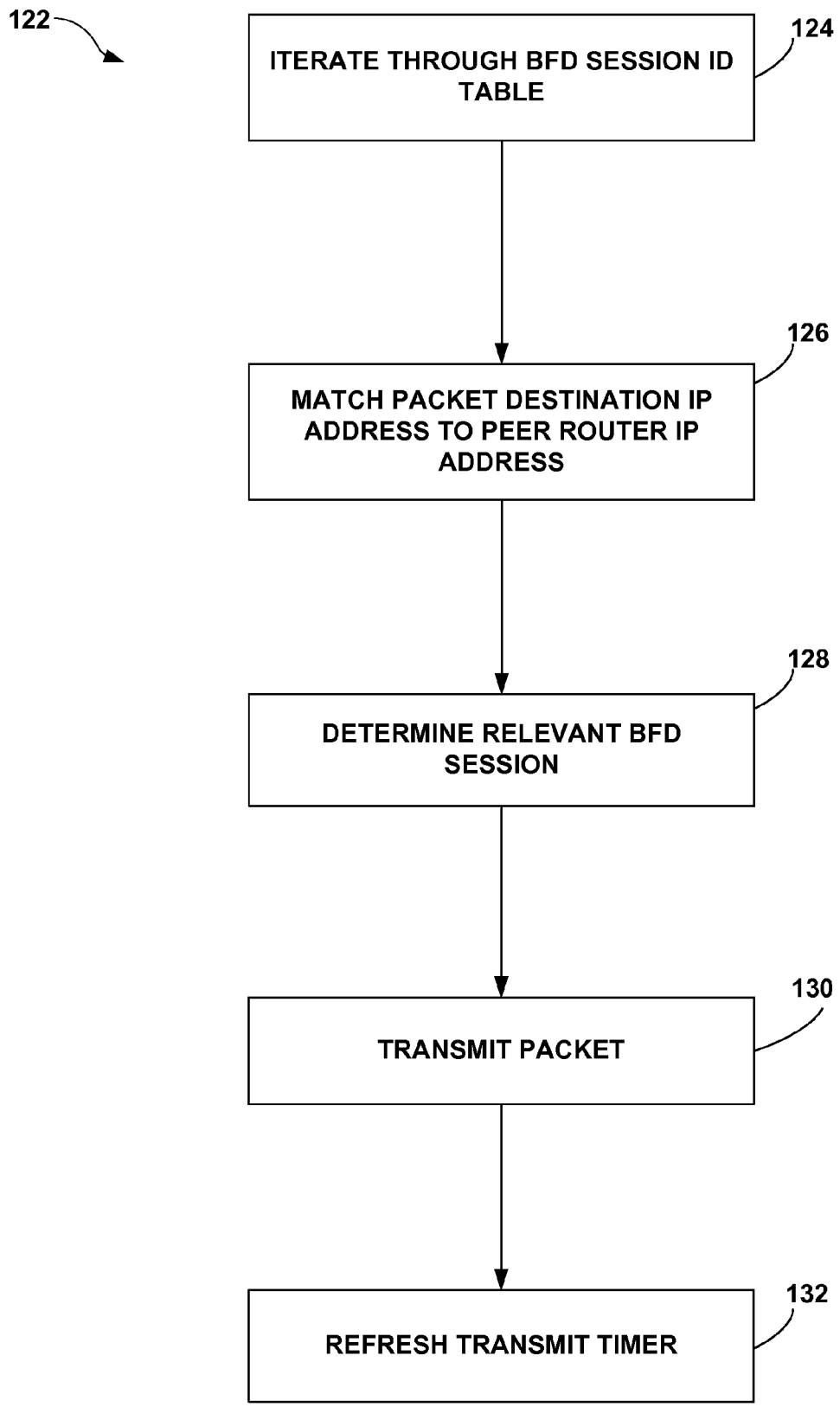

FIGS. 4A-4C are flowcharts illustrating example processes by which a router participates in a BFD session with a peer router, in accordance with one or more aspects of this disclosure. While the various processes of FIGS. 4A-4C may be implemented by any of a variety of network devices, for purposes of clarity only, these processes are described herein with reference to router 30 of FIG. 2, and its various components, including the components illustrated in FIG. 3.

Process 100 of FIG. 4A begins when router 30 establishes a BFD session with a second router (102). For instance, router 30 may establish the BFD session such that forwarding engine 34 sends and receives periodic communications, and communicates pertinent information, such as failures of link(s) and/or peer router(s), to routing engine 32. To detect and remediate communication issues due to failures, routing engine 32 and forwarding engine 34 implement BFD modules 39 and 39', respectively. Additionally, router 30 may synchronize one or more relevant packet identification techniques with the peer router (103). For instance, router 30 may negotiate and sync, with the peer router, one or more algorithms to detect whether a session-external packet is relevant to a particular BFD session. In this manner, router 30 may maintain coherence with the peer router in terms of relevant packet detection, thereby implementing the techniques of this disclosure robustly. More specifically, if router 30 determines that a packet is relevant to a BFD session, implementing the synchronized algorithms may enable the peer router to determine that the same packet is relevant to the BFD session.

In the example of FIG. 4A, traffic analysis module 44 determines that a packet that is external to the BFD session is relevant to the BFD session (104). Examples of packets that are external to the BFD include packets that are associated with communication sessions other than the BFD session, such as BFD packets that belong to other BFD sessions (e.g., with different peer routers), control-plane packets provided by one or more of protocols 40, and transit packets that form forwarding traffic between router 30 and the peer router. As described, the relevant packet may, in certain instances, serve as a substitute for a BFD packet, by establishing liveliness over the link. As the relevant packet is injected into the network for reasons other than liveliness detection, the relevant packet serves a dual purpose, and mitigates the need for additional BFD packets in the BFD session. In this manner, traffic analysis module 44 implements one or more techniques of this disclosure to identify BFD session-external packets as relevant to the BFD session, thereby enabling router 30 to reduce traffic load caused by injecting BFD packets while using the relevant packet for liveliness detection purposes provided by the BFD session.

Traffic analysis module 44 may use various detection schemes to identify a session-external packet as being relevant to a BFD session. In accordance with a first example detection scheme, traffic analysis module 44 identifies a relevant packet based on the packet having "point-to-point" relevance to the BFD session. More specifically, traffic analysis module 44 may use the first detection scheme to match the packet to a BFD session in which the packet's source IP address and destination IP address match the BFD session endpoints. For instance, traffic analysis module 44 may match a source IP address and destination IP address specified in a header of the packet to the IP addresses corresponding to the logical interfaces of router 30 and a peer router that form the endpoints of the BFD session. In other words, traffic analysis module uses the first detection scheme to identify point-to-point relevance for a session-external packet based on the packet being sourced at one BFD session endpoint and being destined for the opposite BFD session endpoint. Traffic analysis module 44 may implement the first detection scheme to identify relevant packets in scenarios where router 30 transmits the relevant packet, as well as in scenarios where router 30 receives the relevant packet.

Traffic analysis module 44 is also configured to implement a second example detection scheme to detect BFD session-external packets that have "transit" relevance to one or more BFD sessions. More specifically, traffic analysis module 44 implements the second detection scheme to identify a relevant packet based on the packet being destined for one BFD session endpoint, and having passed through the other BFD session endpoint in transit. In an example where router 30 forms a transit point for such a packet, traffic analysis module 44 determines, upon router 30 receiving the packet, that the destination IP address specified in the packet header matches the logical interface IP address of the peer router for the BFD session. Additionally, traffic analysis module 44 uses routing information 36 and/or forwarding information 38 to determine that the path by which router 30 forwards the packet to the peer router conforms to the path specified by the BFD session. In this example, traffic analysis module causes BFD module 39' to stamp the packet as being relevant (e.g., by modifying header and/or payload information) to the BFD session, in order to enable the peer router to discern the transit relevance upon receiving the packet. In an example where router 30 is the destination point for the relevant packet, traffic analysis module 44 implements the second detection scheme to read the stamp in the relevant packet, thereby discerning the transit relevance of the received packet.

Additionally, traffic analysis module 44 may implement the second detection scheme for transit relevance differently, depending on characteristics of the relevant BFD session. In one example, traffic analysis module 44 detects that the BFD session is a multi-hop BFD session (i.e., router 30 participates in the BFD session with the peer router using an intermediate router). In this example, traffic analysis module 44 determines transit relevance based solely on matching the destination IP address of the packet to the IP address of the peer router interface associated with the BFD session. In another example, traffic analysis module 44 determines that the BFD session is a single-hop BFD session i.e., router 30 is directly linked to the peer router, with no intermediate routers to effect the connection. In this example, traffic analysis module 44 determines transit relevance based on two criteria. First, traffic analysis module 44 matches the destination IP address of the packet to the IP address of the peer router logical interface engaged in the BFD session. Second, traffic analysis module 44 matches the logical interface from which router 30 forwards the packet to the logical interface through which router 30 engages in the BFD session. In this manner, traffic analysis module 44 implements the second detection scheme differently based on characteristics of a particular BFD session.

Upon receiving a relevant packet detection indication from traffic analysis module 44 of forwarding engine 34, timer refresh module 42 refreshes a timer for the BFD session based on the relevant packet (106). In an example where router 30 transmits the relevant packet, timer refresh module 42 refreshes a transmit timer executed by BFD modules 39 and/or 39' for the BFD session. Conversely, in an example where router 30 receives the relevant packet, timer refresh module 42 refreshes an adjacency timer executed by BFD modules 39 and/or 39' for the BFD session. In this manner, timer refresh module 42 implements one or more techniques of this disclosure to refresh a transmit timer to reduce network load caused by BFD sessions, and to refresh an adjacency timer to avoid erroneous detection of link failures. After timer refresh module 42 refreshes the timer for the BFD session, BFD modules 39 and 39' may continue the BFD session with the peer router, e.g., by continuing BFD packet transmission/detection in cases where no relevant packet is detected for the interval defined by the BFD timer.

In various examples, router 30 (as well as the peer router in the BFD session) may detect a relevant packet in a single-hop BFD session using information pertinent to the interface through which the relevant packet is received or sent. For instance, router 30 may match the source and destination IP addresses of a packet to the interfaces that represent the BFD session endpoints. Additionally, router 30 may check whether the packet traverses the particular link for which the BFD session determines liveliness.

In multi-hop BFD session scenarios, router 30 may match an IP address specified in a packet to one or more IP addresses implemented at router 30. Examples include a global IP address or loopback IP address implemented by router 30, an IP address of the interface through which the packet is received (in instances where router 30 is the Rx router), and IP addresses of other interfaces implemented at router 30. In this manner, techniques of this disclosure enable router 30 to detect relevant packets in scenarios including both single-hop and multi-hop BFD sessions. Additionally, in either single-hop or multi-hop scenarios, the techniques enable router 30 to detect relevant packets based on IP addresses specified within the packet, or using one or more stamps embedded in the packet to indicate relevance.

FIG. 4B illustrates process 110 by which router 30 refreshes an adjacency timer for a BFD session in response to detecting a relevant packet, in accordance with one or more aspects of this disclosure. Process 110 is one specific example of portions of process 100 of FIG. 4A, implemented by router 30 in certain scenarios where router 30 is the destination point of a packet relevant to a BFD session in which router 30 participates. Process 110 begins when router 30 receives a packet, e.g., either directly or indirectly from a peer router in a BFD session (112). The received packet may be external to the BFD session. Traffic analysis module 44 of forwarding engine 34 may match a destination IP address specified in the header of the packet to a local IP address, such as an IP address of a logical interface implemented on router 30 (114). More specifically, traffic analysis module 44 is configured to match the destination IP address to the IP address of the specific logical interface through which router 30 participates in the BFD session.

In some examples, a router participating in a BFD session, in accordance with one or more techniques of this disclosure, builds a BFD session ID table that contains information associated with BFD sessions. For instance, information included in the BFD table may identify a packet to one or more respective BFD sessions. The BFD session ID table may include one or more types of data pertaining to the BFD sessions, such as the IP addresses of the BFD end points of the session, a session type (e.g., single-hop or multi-hop), and the session ID (e.g., a BFD discriminator that uniquely identifies a session). The BFD table may be further filtered to build small tables on a per-interface basis. That is, for each logical interface, a filtered table that contains all entries of a master table that match the logical interface IP address is constructed. The non-interface IP addresses, such as router ID, may be added to the per-interface table without filtering.

In response to matching the destination IP address to the logical interface IP address, traffic analysis module 44 is configured to iterate through a BFD session ID table (116). The BFD session ID table is, in examples, a lookup table that maps the logical interface IP address to various BFD sessions, such as sessions with different peer routers or different logical interfaces of the peer routers. In some implementations, one or both of BFD modules 39 and 39' may construct and update the BFD session ID table to maintain information pertinent to various BFD sessions in which router 30 participates. Additionally, BFD modules 39 and 39' may include an "end-of-table" entry in the BFD session ID table, to prevent infinite loops when traffic analysis module 44 iterates through the BFD session ID table.

By iterating through the table, traffic analysis module 44 may determine one or more BFD sessions to which the received packet is relevant (118). In examples, traffic analysis module 44 uses source IP address information included in the packet header, or stamp included in the header and/or payload of the packet to determine relevance to a BFD session ID entry in the table. In some scenarios, traffic analysis module 44 may determine that the packet is relevant to multiple BFD sessions associated with the logical interface IP address. For instance, traffic analysis module 44 may match the packet to a BFD session in which the packet's source IP address and destination IP address match the BFD session endpoints. Such a packet is referred to herein as having "point-to-point" relevance. In addition, traffic analysis module 44 may match the packet to another BFD session in which the packet includes a stamp indicating the peer router as a BFD endpoint. Such a packet is referred to herein as having "transit" relevance. In this manner, traffic analysis module 44 may detect that a packet has point-to-point relevance for a BFD session, and transit relevance for one or more additional BFD sessions. In examples, traffic analysis module 44 indicates to timer refresh module 42 that the packet is relevant to one or more BFD sessions executed by BFD modules 39 and 39'.

In response to traffic analysis module 44 determining the one or more relevant BFD sessions for the received packet, timer refresh module 42 refreshes the adjacency timer for each relevant BFD timer (120). By refreshing the adjacency timer, timer refresh module 42 defers potential link failure detection, reducing the need for peer routers to increase network load by injecting BFD packets into the network. Additionally, in instances where timer refresh module 42 refreshes adjacency timers for multiple BFD sessions, timer refresh module 42 further alleviates network load by enabling multiple peer routers to defer BFD packet transmission. In this manner, timer refresh module 42 and BFD modules 39 and 39' are configured to implement one or more techniques of this disclosure to reduce network load caused by BFD sessions, while maintaining link liveliness monitoring in accordance with logic provided by the BFD protocol.

FIG. 4C illustrates process 122 by which router 30 refreshes a transmit timer for a BFD session in response to detecting a relevant packet, in accordance with one or more aspects of this disclosure. Process 122 is one specific example of portions of process 100 of FIG. 4A, implemented by router 30 in certain scenarios where router 30 is either the source point or a transit (forwarding) point for a packet relevant to a BFD session in which router 30 participates. Process 122 begins when traffic analysis module 44 iterates through a BFD session ID table for a packet to be transmitted (124). More specifically, the packet to be transmitted is external to one or more BFD sessions indicated in the BFD session ID table. In examples, router 30 generates a BFD session ID table for each logical interface (identified by different IP addresses) executing on router 30. The BFD session ID table includes BFD session IDs for each BFD session to which the respective logical interface is coupled. Additionally, the packet to be transmitted may be a packet generated by router 30 (e.g., the source IP address of the packet may match a local IP address), or a transit packet (e.g., a packet received at forwarding plane 34 with instructions to forward to a different network device).

By iterating through the BFD session ID table for each local IP address, traffic analysis module 44 may match the destination IP address indicated in the packet header to an IP address of a peer router (126). For instance, the IP address of the peer router may correspond to a logical interface via which the peer router participates in a BFD session with router 30. Based on matching the packet destination IP address to the IP address of the peer router, traffic analysis module 44 determines that the packet is relevant to at least one active BFD session between router 30 and the peer router (128). In examples, traffic analysis module 44 may determine that the packet is relevant to multiple BFD sessions with the peer router, such as BFD sessions corresponding to different logical interfaces of the peer router. For instance, traffic analysis module 44 may determine that the packet has point-to-point relevance to a particular BFD session, and has transit relevance to at least one additional BFD session. Additionally, in some implementations, BFD module 39' may stamp the relevant packet, thereby enabling a peer router that receives the relevant packet to identify the packet as relevant to the BFD session, to maintain coherency between router 30 and the peer router for relevant packet detection.

Router 30 is configured to transmit the relevant packet to the peer router (130). Depending on the nature of the packet, router 30 may transmit the packet from either routing engine 32 or forwarding engine 34. In response to router 30 transmitting the relevant packet to the peer router, timer refresh module 42 is configured to refresh the transmit timer for each of the one or more relevant BFD sessions (132). By refreshing the transmit timer(s), timer refresh module 42 defers transmission of a subsequent BFD packet for each relevant BFD session, thereby reducing network load caused by router 30 participating in one or more BFD sessions. In this manner, techniques of this disclosure alleviate network load by enabling a router to reduce BFD packet transmission, while maintaining link liveliness detection in accordance with the logic provided by the BFD protocol.

While described herein with respect to logical interface IP addresses for purposes of example, it will be appreciated that a router may implement one or more techniques of this disclosure, including processes 110 and 122 of FIGS. 4B and 4C respectively, using global IP addresses of the BFD endpoint routers. For instance, in a single-hop BFD session scenario, the endpoint routers may use global IP addresses (e.g., instead of logical interface IP addresses) specified within an attribute of a session-external packet to identify the packet as being relevant to a particular BFD session. In some implementations, the endpoint routers may, in the case of a multi-hop BFD session, default to using the global IP addresses specified within attribute(s) of a session-external packet to determine relevance.

The techniques described in this disclosure may be implemented in hardware or any combination of hardware and software (including firmware). Any features described as units, modules, or components may be implemented together in an integrated logic device or separately as discrete but interoperable logic devices. If implemented in hardware, the techniques may be realized in a processor, a circuit, a collection of logic elements, or any other apparatus that performs the techniques described herein. If implemented in software, the techniques may be realized at least in part by a non-transitory computer-readable storage medium or computer-readable storage device encoded with, having stored thereon, or otherwise comprising instructions that, when executed, cause one or more processors, such as programmable processor(s), to perform one or more of the methods described above. The non-transitory computer-readable medium may form part of a computer program product, which may include packaging materials. The non-transitory computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein, may refer to any of the foregoing structures or any other structure suitable for implementation of the techniques described herein. Likewise, the term "control unit," as used herein, may refer to any of the foregoing structures or any other structure suitable for implementation of the techniques described herein. In addition, in some aspects, the functionality described herein may be provided within dedicated software and hardware units configured to perform the techniques of this disclosure. Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various examples have been described. These and other examples are within the scope of the following claims.

What is claimed is:

1. A method comprising:
   generating, by an application executing on a routing engine that executes at least one routing protocol to control operation of a router, a packet, wherein the packet is a non-bidirectional forwarding detection (BFD) packet that does not encapsulate a BFD packet;
   receiving, by a packet forwarding engine of the router from the routing engine, the packet;
   forwarding, by the packet forwarding engine via a network interface coupled to the packet forwarding engine, the packet; and
   refreshing, by the packet forwarding engine in response to determining the packet is destined for a peer network device with which the router has a BFD session and without sending a BFD packet, a transmit timer for the BFD session that defines a transmission interval for sending BFD packets from the router to the peer network device.

2. The method of claim 1, wherein the packet does not include a BFD session identifier that identifies the BFD session.

3. The method of claim 1,
   wherein the application comprises a routing protocol application that executes a routing protocol, and
   wherein the packet comprises application data for the routing protocol.

4. The method of claim 1, wherein the router is an endpoint for the BFD session.

5. The method of claim 1, further comprising:
   storing, by the packet forwarding engine, data defining a plurality of BFD sessions including the BFD session, each of the BFD sessions defined in part by a destination Internet Protocol (IP) address,
   wherein determining the packet is destined for a peer network device with which the router has the BFD session comprises matching, by the packet forwarding engine, a destination IP address of the packet to a destination IP address of the BFD session of the plurality of BFD sessions.

6. The method of claim 1, further comprising:
   modifying, by the packet forwarding engine, an Internet Protocol (IP) header of the packet to include a BFD session identifier for the BFD session.

7. The method of claim 6, wherein modifying the IP header comprises modifying one or more reserved bits of the IP header to include the BFD session identifier.

8. A network device comprising:
   a routing engine having at least one processor configured to execute an application to generate a packet, wherein the packet is a non-bidirectional forwarding detection (BFD) packet that does not encapsulate a BFD packet, and wherein the at least one processor is further configured to execute at least one routing protocol to control operation of the network device;
   a packet forwarding engine coupled to a network interface, wherein the packet forwarding engine is configured to receive, from the routing engine, the packet,
   wherein the packet forwarding engine is configured to forward, via the network interface, the packet, and
   wherein the packet forwarding engine is configured to refresh, in response to determining the packet is destined for a peer network device with which the network device has a BFD session without sending a BFD packet, a transmit timer for the BFD session that defines a transmission interval for sending BFD packets from the network device to the peer network device.

9. The network device of claim 8, wherein the packet does not include a BFD session identifier that identifies the BFD session.

10. The network device of claim 8,
    wherein the application comprises a routing protocol application configured to execute a routing protocol, and
    wherein the packet comprises application data for the routing protocol.

11. The network device of claim 8, wherein the router is an endpoint for the BFD session.

12. The network device of claim 8, further comprising:
    a computer-readable storage medium storing data defining a plurality of BFD sessions including the BFD session, each of the BFD sessions defined in part by a destination Internet Protocol (IP) address,
    wherein to determine the packet is destined for a peer network device with which the router has the BFD session the packet forwarding engine is further configured to match a destination IP address of the packet to a destination IP address of the BFD session of the plurality of BFD sessions.

13. The network device of claim 8, wherein the packet forwarding engine is further configured to modify an Internet Protocol header of the packet to include a BFD session identifier for the BFD session.

14. The network device of claim 13, wherein the packet forwarding engine is further configured to modify the IP header by modifying one or more reserved bits of the IP header to include the BFD session identifier.

15. A method comprising:
    receiving, by a router, a packet, wherein the packet is a non-bidirectional forwarding detection (BFD) packet that does not encapsulate a BFD packet;
    determining, by the router, the packet is destined for the router; and
    refreshing, by the router in response to determining an Internet Protocol header of the packet includes a bidirectional forwarding detection (BFD) session identifier inserted by an intermediate router that is a peer router of the router for a BFD session identified by the BFD session identifier, a timer for the BFD session, wherein the timer defines a receipt interval for receiving BFD packets by the router from the peer router for the BFD session.

16. The method of claim 15, wherein refreshing the timer associated with a BFD session identified by the BFD session identifier further comprises refreshing the timer in response to determining the BFD session is a multi-hop BFD session.

17. The method of claim 15,
wherein receiving the packet comprises receiving the packet on a logical interface of the router, and
wherein refreshing the timer associated with a BFD session identified by the BFD session identifier further comprises refreshing the timer in response to determining the BFD session is a single-hop BFD session and determining a logical interface of the router associated with the BFD session matches a logical interface on which the packet was received.

18. The method of claim 15, wherein one or more reserved bits of the IP header include the BFD session identifier.

19. A network device comprising:
a packet forwarding engine coupled to a network interface and configured to receive a packet, wherein the packet is a non-bidirectional forwarding detection (BFD) packet that does not encapsulate a BFD packet,
wherein the packet forwarding engine is configured to determine the packet is destined for the network device, and
wherein the packet forwarding engine is configured to refresh, in response to determining an Internet Protocol header of the packet includes a bidirectional forwarding detection (BFD) session identifier inserted by an intermediate router that is a peer router of the network device for a BFD session identified by the BFD session identifier, a timer for the BFD session, wherein the timer defines a receipt interval for receiving BFD packets by the network device from the peer router for the BFD session.

20. The network device of claim 19, wherein to refresh the timer associated with a BFD session identified by the BFD session identifier the packet forwarding engine is configured to refresh the timer in response to determining the BFD session is a multi-hop BFD session.

21. The network device of claim 19,
wherein to receive the packet the packet forwarding engine if configured to receive the packet on a logical interface configured in the packet forwarding engine, and
wherein to refresh the timer associated with a BFD session identified by the BFD session identifier the packet forwarding engine is configured to refresh the timer in response to determining the BFD session is a single-hop BFD session and determining a logical interface of the network device associated with the BFD session matches a logical interface on which the packet was received.

22. The network device of claim 19, wherein one or more reserved bits of the IP header include the BFD session identifier.

* * * * *